United States Patent [19]

Weisman

[11] Patent Number: 5,332,760
[45] Date of Patent: Jul. 26, 1994

[54] MODIFIED LOW-DENSITY POLYURETHANE FOAM BODY

[76] Inventor: Morey Weisman, 147-23 B Charter Rd., Jamaica, N.Y. 11435-1239

[21] Appl. No.: 106,572

[22] Filed: Aug. 16, 1993

Related U.S. Application Data

[62] Division of Ser. No. 44,199, Apr. 8, 1993, Pat. No. 5,272,001.

[51] Int. Cl.$^5$ ............................................. C08J 9/236
[52] U.S. Cl. ........................................ 521/54; 521/137
[58] Field of Search ................................ 521/54, 137

[56] References Cited

U.S. PATENT DOCUMENTS

| | | | |
|---|---|---|---|
| 3,615,972 | 10/1971 | Morehouse Jr. et al. | 521/56 |
| 4,097,423 | 6/1978 | Dieterich | 521/122 |
| 4,105,594 | 8/1978 | Dieterich et al. | 521/100 |

Primary Examiner—Morton Foelak
Attorney, Agent, or Firm—Michael Ebert

[57] ABSTRACT

A low-density, open-cell flexible polyurethane foam body that is modified to impart resilience and enhanced shock-absorbency properties thereto. Modification is effected by implanting in the open cells of the body expandable microspheres having particle sizes in the micron range, each microsphere being formed by a gas proof polymeric shell encapsulating a drop of liquid isobutane. The microspheres are expanded by heat to more than fifty times their initial volume and are entrapped in the open cells of the body. The expanded microspheres are constituted by a soft polymeric shell enclosing a compressible gas, the expanded microspheres behaving as miniature springs dispersed throughout the body.

7 Claims, No Drawings

MODIFIED LOW-DENSITY POLYURETHANE FOAM BODY

RELATED APPLICATION

This application is a division of my copending application of the same title, Ser. No. 08/044,199, filed Apr. 8, 1993 U.S. Pat. No. 5,272,001.

BACKGROUND OF INVENTION

1. Field of Invention

This invention relates generally to flexible polyurethane foam material of the open-cell type, and more particularly to a low-density flexible polyurethane foam body which is modified to impart resilience and enhanced shock absorbing properties thereto.

2. Status of Prior Art

It is known to use synthetic plastic flexible foam material as an underlay for carpets and rugs, for automotive seating and padding and in many other applications requiring cushioning and shock absorbing properties. The materials usually used for this purpose are polyurethane foam, foam rubber and polyvinyl chloride plastic material.

Among the advantages of polyurethane foam over vinyl and other commercially-available forms of foam plastics, are that polyurethane foam has markedly superior thermal and acoustical insulating properties as well as a more uniform cell structure. Moreover, not only is polyurethane foam much lighter than vinyl foam, a significant factor in handling and transportation costs, but it is a far more economical material.

Many practical applications exist for a polyurethane foam product of low-density having some degree of firmness and good load bearing characteristics. A product having such properties would be useful, for example, in automobile seat cushions, upholstery and bedding. This combination of characteristics cannot be obtained when the foam is derived from a standard polyol intermediate; for to achieve firmness, the foam must then be of a higher density. The resultant weight of the higher density product is objectionable in many applications, to say nothing of costs which go up substantially with an increased density.

One can produce relatively low cost, low-density polyurethane foam using a polymer/polyol intermediate in the formulation to obtain a very firm product having excellent load bearing characteristics. Polymer/polyol intermediates suitable for this purpose are disclosed in the Seefried, Jr. et al patent 4,111,865. These compositions are made by the in situ polymerization of a vinyl polymeric base, to give a dispersion of the vinyl polymeric portion in the liquid polymer. Polymer/polyols are characterized by the presence of polymer-to-polyol grafted species. Polyurethane foam products are made from the polymer/polyol grafted species.

Polyurethane foam products made from the polymer/polyol compositions disclosed in the Seefried, Jr. et al. patent are less susceptible to static fatigue, so that when the load imposed thereon is lifted, the foam returns to its original unloaded state and does not remain deformed.

The degree of firmness of a flexible polyurethane foam product is defined by its indentation load deflection properties (ILD). Thus when the ILD is in the range of 18 to 24, it is classified as soft; when the ILD is in the 24 to 30 range, it is medium soft; whereas the 30 to 36 range affords medium firm properties; the 36 to 46 range, firm properties, the ILD's above 46 being very firm. Foams made with polymer/polyol intermediates fall into the firm and very firm ranges and are not suitable for those applications which require less firm and medium soft ILD's of low density foam.

It is known to modify polyurethane foam to alter its dielectric characteristics so as to impart thereto a loss factor which lends itself to dielectric heating techniques. One approach is that set forth in the Schickendanz patent 3,061,460 which involves the post impregnation of urethane foam of the ester or ether type with a vinyl plastic to so alter the dielectric properties of the foam as to render it dielectrically heatable.

Another approach is that disclosed in the Weisman patent 3,244,571 in which the polyurethane foam is modified by the introduction of vinyl resin. This is accomplished by including vinyl particles in the foam-forming reaction mixture. In this way, the vinyl is diffused during the foaming process throughout the fibrous structure of the foam without filling the cells thereof, so that the structure of the foam retains its normal cushioning and acoustic insulating properties that would otherwise be degraded had the cells been impregnated. Other examples of post-impregnation may be found in the Dugan patent 3,393,119, the Fishbein patent 3,535,197 and the Hand patent 3,585,062. Also of prior art interest are the Weisman patents 4,482,582 and 4,525,386 in which polyvinyl particles are impregnated by forced air into the open cells of polyurethane foam to impart dielectric heat-sealing properties to the foam. But such modification of the polyurethane foam does not impart resilience thereto.

A conventional, low-density polyurethane is lacking in resilience, hence it is not fully suitable as a carpet underlay or in similar cushioning applications where when the carpet is stepped on, the foam tends to bottom out, and does not recover its initial form.

SUMMARY OF INVENTION

In view of the foregoing, the main object of this invention is to provide a low-density polyurethane foam body of the open-cell type which is modified to impart resilience and enhanced shock absorbing properties thereto.

More particularly, an object of the invention is to provide a modified polyurethane foam body of the above type, in whose open-cell are entrapped expanded microspheres each formed by a flexible polymeric shell encasing a compressible gas.

Also an object of the invention is to provide a technique for modifying a standard flexible polyurethane foam of the low-density, open-cell type so as to impart resilience enhanced shock-absorbing and dielectric heat-sealing properties thereto.

Still another object of the invention is to provide a modified polyurethane body of the above-type which can be produced at relatively low cost.

Briefly stated, these objects are accomplished in a low-density, open-cell flexible polyurethane foam body that is modified to impart resilience and enhanced shock-absorbing properties thereto. Modification is effected by implanting in the open cells of the body expandable microspheres having particle sizes in the micron range, each unexpanded microsphere being formed by a gas proof polymeric shell encapsulating a drop of liquid isobutane. The microspheres are expanded in the open cells of the body. The expanded microspheres are constituted by a soft polymeric shell enclosing a compressible gas, the expanded microspheres behaving as miniature springs dispersed throughout the body.

DESCRIPTION OF INVENTION

The Basic Polyurethane Foam Production Technique:

In modifying a polyurethane foam to impart resilience and enhanced shock-absorbing properties thereto, any known formulation for producing ordinary polyurethane foam may be used, such as the formulation set forth in the Weisman 3,499,848, or in the other patents cited hereinabove. The basic process will first be described using a standard polyol intermediate. The basic process for making homogeneous polyurethane foam of elastic consistency are disclosed in U.S. Pat. No. 2,764,565 issued Sep. 25, 1956. Many polyurethane flexible foams are based on diethylene glycoladipic acid polyesters.

In the preparation of the polyurethane foam-forming reaction mixture for use in this invention, either the so-called "one-shot method" may be used or one may use the two-step process known as the semi-prepolymer or quasi-prepolymer technique. Any combination of polyether, polyols, organic polyisocyanates, foaming agent, catalyst and other reactants capable of forming a flexible or semi-flexible polyurethane foam can be employed in carrying out the invention. The term foam-forming reaction mixture in the specification and claims herein is meant to include any such combination of ingredient. Typical formulations are described in U.S. Pat. No. 3,072,582, issued Jan. 8, 1963 and U.S. Pat. No. 3,679,718, issued Jul. 9, 1972.

To further illustrate suitable formulations, the polyether polyols, useful for the preparation of the polyurethane material include oxyalkylated polyhydric alcohols having a molecular weight in the range between about 200 and about 10,000 and preferably between about 1,000 and 8,000. The hydroxyl number of the polyether polyol is generally less than about 750 and preferably in the range between about 20 and about 175. These oxyalkylated polyhydric alcohols are generally prepared by reacting, in the presence of an alkaline catalyst, a polyhydric alcohol and an alkylene oxide, propylene oxide, butylene oxide, amylene oxide, epichlorohydrin, and mixtures of these alkylene oxides, by either random addition or step-wise addition, as is well-known in the art. If desired, a portion of the polyether polyols may be replaced with another compound having at least two reactive hydrogen atoms, such as a diol, an alkyl amine, and alkylene polyamine, a cyclic amine, an amide, or a polycarboxylic acid.

In a preferred foam of open-cell polyurethane foam, a polyol blend is employed comprising a polyether triol, having a molecular weight range of about 1,000–8,000 and a hydroxyl number range of about 20–175, and a diol having a molecular weight range of about 60–3,000 and a hydroxyl number range of about 50–200. The weight ratio of polyether triol to diol, according to this preferred form, can range from about 1:8 to about 6:8.

The organic polyisocyanates used in the preparation of the polyurethane foam-forming reaction mixture include toluene diisocyanate, ethylene diisocyanate, propylene diisocyanate, methylene-bis (4-phenylisocyanate), 3,3'-bitoluene-4,4'-diisocyanate, hexamethylene diisocyanate, naphthalene-1,5-diisocyanate, polyphenylene polymethylene polyisocyanate, mixtures thereof and the like. The amount of polyisocyanate employed in the process should be sufficient to provide at least about 0.7 NCO group per reactive hydrogen present in the total reaction system. An excess of isocyanate compound may be conveniently employed; however, this is generally undesirable due to the high cost of the isocyanate compounds. It is preferable, therefore, to employ sufficient polyisocyanate to provide no greater than about 1.25, and preferably between about 0.9 and about 1.15, NCO groups per reactive hydrogen.

The polyurethane foam-forming reaction mixture also contains a foaming agent, a reaction catalyst, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, alkenes, ethers and mixtures thereof. Typical halogenated hydrocarbons include, but are not limited to, monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkanes and ethers such as methane, ethane, ethylene, propane, propylene, pentane, hexane, heptane, ethyl ether, diisopropyl ether, mixtures thereof, and the like. It is preferred, however, to use water, either alone or in combination with an organic foaming agent.

The amount of foaming agent employed may be varied within a wide range. Generally, however, the halogenated hydrocarbons are employed in an amount from about 1 to 50 parts by weight of the polyol, and water is generally employed in an amount from about 1.0 to 6.0 parts by weight per 100 parts by weight of the polyol.

The polyurethane foam-forming reaction mixture further contains a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane foam-forming reaction mixture to employ minor amounts of a conventional surfactant in order to further improve the cell structure of the polyurethane foam. Typical of such surfactants are the silicone oils and soaps, and the siloxane-oxyalkylene block copolymers. U.S. Pat. 15 No. 2,834,748 and T. H. Ferrigno, Rigid Plastic Foams (New York: Reinhold Publishing Corp., 1963), pp. 38–42, disclose various surfactants which are useful for this purpose. Generally up to 2 parts by weight of the surfactant are employed per 100 parts of the polyol.

Various additives may also be employed which serve to impart different properties to the resulting foam, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may also be included in the foam-forming composition. The urethane foam may be rendered fire-retardant by the inclusion of antimony oxide and other ingredients in the PVC additive, as disclosed in patent 3,574,149 or by the inclusion of aluminum hydrate (Alcoa HYDRAL #705 and #710). Unlike inert fillers, hydrated alumina stands up to fire by giving off water vapor as heat is absorbed - to extend the flash point and snuff the flame. Moreover, HYDRAL is a good vinyl resin stabilizer, particularly with regard to heat stability and volume resistivity because water is dielectric heat sealability of the product along the line of seal.

Expandable Microspheres

In a modified open-cell polyurethane foam in accordance with the invention, the flexible foam body is of low-density in a range, about one pound per cubic foot to about 5 pounds per cubic foot. The density is so low, that prior to its modification, the foam is lacking in resilience and it has a low degree shock-absorbence. The reason a low-density polyurethane foam is unsuitable as an underlay for a carpet or rug, is that it tends to bottom out under pressure, and therefore lacks cushioning and shock-absorbing properties.

In modifying the low-density body, implanted in the open-cells of the polyurethane foam are expandible microsphares whose particle sizes are in the micron range. The manner in which these microspheres are impregnated in the open-cells of the body and then heated to modify the characteristics of the body will be set forth in the next section of the specification, the present section dealing with the nature of the microspheres and where they are obtainable.

Expandable microsphere suitable for modifying the characteristics of an open-cell low-density polyurethane body are commercially available, and one source being Nobel Industries of Sweden which markets such microspheres under the trademark EXPANCEL.

EXPANCEL-DU microspheres are dry, unexpanded microspheres consisting of small spherical particles with an average diameter of 10 to 15 micron based on volume. The sphere is formed of a gas proof polymeric shell (polyvinylidene chloride - PVD), encapsulating a minute drop of liquid isobutane. When these microspheres are subjected to heat at an elevated temperature level (i.e., 150 to 200° C.) sufficient to soften the thermoplastic shell and to volatilize the liquid isobutane encapsulated therein, the resultant gas expands the shell and increases the volume of the microspheres.

When expanded, the microspheres have a diameter 3.5 to 4 times their original diameter of as a consequence of which their expanded volume is about 50 to 60 times greater than their initial volume in the unexpanded state. Microspheres are also available whose shell is of acrylonitrile.

EXPANCEL unexpanded microspheres are used in printing inks to create 3-D patterns on sportswear, fabrics and wall paper. Unexpanded microspheres are also incorporated in paper and board to improve their stiffness and bulk and to decrease weight. And in non-woven materials, unexpanded microspheres are used to improve stiffness and to decrease weight. Pre-expanded microspheres are commonly used as light weight fillers in paints, to improve their applicability and to decrease weight. For explosives, pre-expanded microspheres serve to enhance sensitivity.

In the context of the present invention, microspheres in their unexpanded states are introduced into a polyurethane foam material and they are expanded by heat to create expanded microspheres which are introduced in the open-cells of the urethane to modify the characteristics of the foam as will beexplained in the next section.

The Modified Open-Cell Polyurethane Foam

In an open-cell low-density flexible polyurethane foam body in accordance with the invention, the body is modified by means of expandable microspheres which when expanded are entrapped in the open-cells and are dispersed in throughout the body. The preferred type microspheres for modifying the foam is EXPANCEL 551 which in the unexpanded state has an average particle size of 6 to 9 micron and in the expanded state, 25 to 35 micron.

Each of the expanded microspheres entrapped in an open-cell of the low-density polyurethane foam has a soft, gas proof, polymeric shell enclosing compressible isobutane gas. When the expanded microsphere is subjected to pressure, it is deformed thereby, but when the pressure is released, the microsphere recovers its original shape and size. Hence, each entrapped expanded microsphere acts as a miniature spring, the modified polyurethane body having a myriad of such springs disposed throughout its body.

When the modified polyurethane body takes the form of an underlay pad one-half inch in thickness which is placed under a carpet, the pad then acts as a shock-absorbing cushion. Hence, when the carpet is laid on a hard floor surface, one has the feeling of walking on a soft, yieldable surface. And the pad will not bottom out, for when pressure is applied thereto, it acts to compress the expanded microspheres dispersed throughout the pad, and when the pressure is later released, the pad recovers its original form. Thus the pad behaves as if it were made of resilient material.

The modified flexible low-density, open-cell polyurethane foam body is useable in those applications in which resilience as well as shock or energy absorbing properties are required. Thus the body is useable not only to cushion carpets and as an underlay for rugs, but also in automotive seating, and arm rests, automobile door panels and sun visors. It is also useable for cushioned footwear and as cushioning in athletic gear, such as helmets and knee protectors.

Implantation Techniques

The unexpanded microspheres as implanted in the open-cells of the low-density polyurethane body either in situ or by post-impregnation where the particles must be heated to an elevated temperature to fully expand the microspheres so that they become entrapped in the cells. And in either case the percentage of microspheres in parts per weight is between about 20 to 80 percent, depending on the degree of resilience, enhanced shock-absorbing properties and impact resistance one wishes to impart to the polyurethane foam body.

In in situ implantation, the unexpanded microspheres are fed into a urethane foam-forming mixture and thoroughly intermingled and dispersed throughout the mixture by mixing blades or similar expedient. The unexpanded microspheres are subjected to the exothermic reaction which takes place in the liquid-forming reaction mixture. The temperature of the exothermic reactions depends on the material of the foaming mixture, and in practice the temperature can be as low as 270° F. and as high as 330° F. Temperatures in that range are high enough to expand the microspheres.

Thus as foaming takes place to create open-cells in the polyurethane, these cells are occupied by the unexpanded microspheres which are expanded by the exothermic reaction and entrapped in the cells when urethane foam becomes solidified.

Thus as foaming occurs to create interconnected open-cells in the polyurethane, these cells are occupied by the particles of unexpanded microspheres which in the course of foaming are expanded by the exothermic reaction. As a consequence, when the foam body cures and solidifies, entrapped in its open-cells are expanded microspheres.

In post-implantation, one first produces a low-density open-cell polyurethane foam body, and then uses forced air, a jet zone technique of the type disclosed in patent 3,329,377 or other expedients to flow the microspheres into the open-cells of the body. One may also use a vacuum technique to draw the microspheres into the open-cells. For blowing, one may employ a high velocity air blower or a spray gun which is operated to scan across the body of the body to distribute the microspheres uniformly therein. Since, the body is usually a polyurethane foam layer having a thickness of ⅛th to one inch in thickness, the blown-in microspheres penetrate the entire layer. In post-implantation, after the open-cells are impregnated with unexpanded microspheres, the body must then be heated to expand the microspheres. This may be carried out in a conventional convection oven for one or more minutes, depending on the density of the foam and its thickness, after which the body is cooled to room temperature.

In practice the heating step may be carried out in an industrial microwave oven, for the dielectric characteristics of the polyvinylidene chloride spheres are similar to PVC, and these spheres therefore absorb microwave energy (70 to 100 MHz) whereas the dielectric characteristics of polyurethane renders the material relatively insensitive to microwave energy.

Dielectric Heat-Sealing

The Weisman patent 3,244,571 discloses a polyurethane foam that is modified to render it dielectrically heat-sealable. This is done by introducing PVC particles in the foam-forming reaction mixture so that the particles are dispersed throughout the foam and alter the dielectric properties of the foam.

When expanded microspheres of polyvinylidene chloride or acrylonitrile are entrapped in the open-cells of a polyurethane foam in accordance with the invention and the percentage by weight of the microspheres are relatively high, then the foam has imparted thereto dielectric heat-sealing properties as well as resilience and shock-absorbence. In practice, one may blow into the cells a mixture of PVC particles and unexpanded microspheres which are thereafter expanded.

Standard, open-cell low-density flexible polyurethane foam usually more or less suffer from pin-holes. These are voids in the foam body which show up when the body is sliced or peeled. Such voids are undesirable, for they give rise to hazardous arcing in the dielectric heat-sealing process. But in a modified body in accordance with the invention, the voids as well as the open-cells are filled with expanded microspheres which inhibit such arcing, and since the air which normally fills the cells is supplanted by expanded microspheres, the modified polyurethane foam is more responsive to microwave energy.

While there has been disclosed, various forms of modified open-cell low-density polyurethane foams bodies and various technique for modifying such bodies to impart resilience and other properties lacking in the unmodified body, it will be appreciated that many changes may be made without departing foam the essential spirit of the invention. Thus in making foam modified in situ, the catalyst used in the foam-forming mixture is preferably of the non-amine type.

I claim:

1. A low-density, open-cell polyurethane body modified to impart resilience and enhanced shock-absorbing properties thereto, the cells having entrapped therein expanded microspheres of a vinylidene chloride polymer each defined by a soft, gas proof polymeric shell enclosing a compressible isobutane gas whereby the expanded microspheres act as miniature springs which are dispersed throughout the body which when the body is subjected to pressure and is deformed thereby are compressed and when the pressure is released cause the body to recover its normal form.

2. A modified polyurethane body as set forth in claim 1, in which the density of the foam body has a weight of about 1 to 5 pounds per cubic foot.

3. A modified polyurethane body as set forth in claim 1, in which the polyurethane is made from a polyether reactant.

4. A modified polyurethane body as set forth in claim 1, wherein the percentage of microspheres to polyurethane foam, by weight is in the range about 10 to 80%.

5. A modified polyurethane body as set forth in claim 4, in which the percentage is such as to render the body dielectrically heat-sealable.

6. A body as set forth in claim 1, in which the expanded microspheres have sizes in the range of about 25 to about 35 micron.

7. A body a set forth in claim 1, in which the polymeric shell imparts dielectric heat sealing properties to the body.

* * * * *